Dec. 20, 1927.
B. J. GUNDLACH
CUTTING MACHINE
Filed May 29, 1925
1,653,563
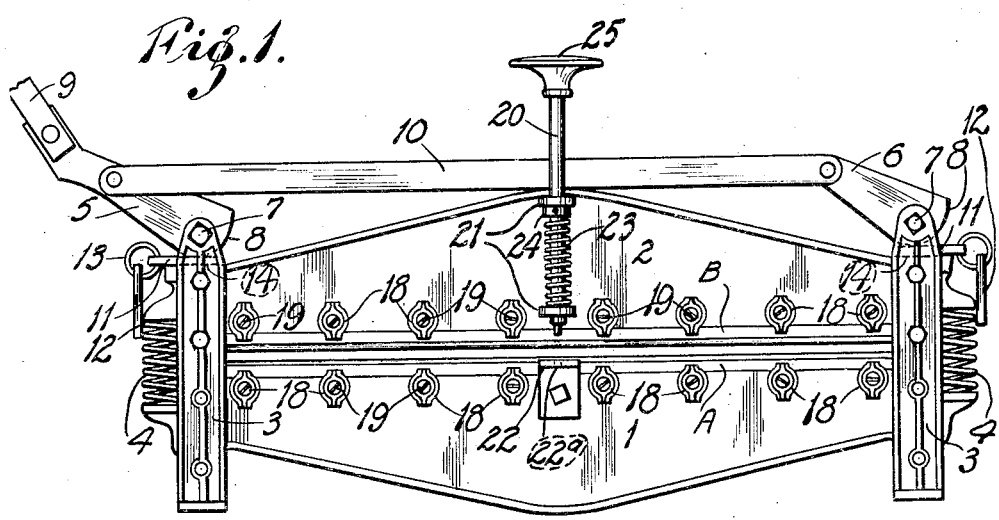
INVENTOR
BENO J. GUNDLACH
BY Bakewell & Church
ATTORNEYS Patented Dec. 20, 1927.

1,653,563

UNITED STATES PATENT OFFICE.

BENO J. GUNDLACH, OF BELLEVILLE, ILLINOIS.

CUTTING MACHINE.

Application filed May 29, 1925. Serial No. 33,716.

This invention relates to cutting machines of the kind shown in my prior U. S. Patent No. 1,119,506, dated December 1, 1914, which is intended to be used principally for cutting asbestos shingles.

The main object of my present invention is to provide a cutting machine of the general type referred to that is equipped with an easily operable means of simple design for enabling the stroke of the movable cutter to be varied when shingles or sheets of different thicknesses are to be cut in the machine.

Another object is to provide a hand-operated shingle cutting machine that is equipped with a novel mechanism for punching holes in the shingles.

And still another object of my invention is to provide a novel means for securing the cutters to the cutter holders.

Figure 1 of the drawings is a side elevational view of my improved cutting machine.

Figure 2 is an end view of the machine.

Figure 3 is a side elevational view of a portion of the movable cutter holder, illustrating one means that can be used for enabling the stroke of the movable cutter to be varied.

Figure 4 is a similar view, illustrating another means that can be used for enabling the stroke of the movable cutter to be varied; and Figure 5 is a side elevational view of the adjustable wedge that forms part of the mechanism shown in Figure 4.

My present machine is of the same general design as the machine described in my said prior patent and comprises two cutters or knife blades A and B aranged horizontally in opposed relation, a holder 1 for the stationary cutter A, a holder 2 for the movable cutter B, vertically-disposed guides 3 at the opposite ends of the stationary cutter holder 1 that embrace the movable cutter holder 2 and guide the same when the movable cutter is moved towards and away from the stationary cutter, springs 4 arranged between the end portions of the cutter holders 1 and 2 for normally maintaining the movable cutter holder in its elevated position, and an actuating mechanism for the movable cutter consisting of two levers 5 and 6 pivotally connected at 7 to the upper ends of the vertically-disposed guides 3 and provided with cams 8 that are used for moving the cutter holder 2 downwardly, an operating handle 9 on the lever 5 and a link or other equivalent means 10 for transmitting movement from the lever 5 to the lever 6.

In order that the stroke of the movable cutter holder 2 may be varied when shingles of different thicknesses are to be cut in the machine, said movable cutter holder 2 is provided with variable elements on which the cams 8 act. In the form of my invention illustrated in Figures 1 and 3 said variable elements consist of shims 11 and 12 of different thicknesses that are adapted to be mounted on the top side of the end portions of the holder 2 so as to form bearing surfaces on which the cams 8 of the levers 5 and 6 act. As shown in Figure 1, the machine is equipped with two pairs of shims, each of which pairs comprises a thick shim 11 and a thin shim 12 connected together by a ring 13 or other suitable connecting device. When the machine is to be used for cutting thin shingles the thick shims 12 are mounted on horizontally-disposed supporting surfaces 14 at the ends of the movable cutter holder 2 so that they will be engaged by the cams 8 when the operating lever 9 is moved in a direction to move the cutter B towards the cutter A.

Any suitable means can be used for preventing said shims from shifting out of operative relationship with the cams 8, the means herein illustrated for this purpose consisting of pins 15 that project upwardly from the surfaces 14 of the cutter holder B and holes 16 in the shims for receiving said pins. If thick shingles are to be cut in the machine the thick shims 12 are removed from the supporting surfaces 14 at the ends of the cutter holder 2 and the thin shims 11 are then arranged in operative position on said supporting surfaces. When one set of shims are in use the other set of shims hang free at the ends of the machine, as shown in Figure 1. Such a means for enabling the stroke of the movable cutter to be varied is inexpensive to construct, it is of such simple design that it will not get out of order and it is of such a character that the purpose for which it is used is so perfectly obvious that there is little liability of the user not being able to understand how the machine can be changed or adjusted when shingles or sheets of different thicknesses are to be cut.

In Figures 4 and 5 of the drawing I have illustrated another means that can be used for enabling the stroke of the movable cutter holder 2 to be varied, which means consists of wedges 17 mounted on inclined supporting surfaces 14$^a$ at the ends of the movable cutter holder 2 and adapted to be moved longitudinally of said holder so as to virtually change the elevation of the portions of the cutter holder 2 on which the cams 8 act. In the form of my invention illustrated in Figures 4 and 5 each of the inclined supporting surfaces 14$^a$ on the movable cutter holder 2 is provided with an upwardly-projecting pin 15$^a$ and each of the wedges 17 is provided with two holes 16$^a$ that are adapted to receive said pin. If desired, the wedges 17 can be provided with numbers or other suitable indicia which show how the wedges 17 should be arranged when shingles of different thicknesses are to be cut in the machine. For example, each of the wedges can have the fraction "1/4" marked on the edge of same adjacent one of the holes 16$^a$ and can have the fraction "1/8" marked on its edge adjacent the other hole 16$^a$. If shingles one-eighth of an inch in thickness are to be cut in the machine the wedges 17 are mounted on the inclined supporting surfaces 14$^a$ of the movable cutter holder 2 in such a way that the pins 15$^a$ project upwardly through the holes 16$^a$ in the wedges that are arranged adjacent the fractions "1/8". If thicker shingles are to be cut in the machine, for example, shingles of one-fourth of an inch in thickness, the wedges 17 are shifted outwardly so as to arrange the pins 15$^a$ in the holes 16$^a$ of the wedges that are located adjacent the fractions "1/4" on said wedges. Preferably each of the cutter holders is provided on one of its longitudinal edges with a rabbet that receives the cutter of the holder and which is so proportioned that the outer side face of the cutter will extend flush with the outer side face of the holder, the cutter being retained in operative position in said rabbet by a plurality of clamps 18 secured to the holder by adjustable fastening devices 19 that are arranged at points outside of said rabbet, said clamps being so proportioned that the outer ends of same will lap over the side face of the cutter, as shown more clearly in Figures 3 and 4 and thus clamp the cutter tightly against the side wall of the rabbet. When the fastening devices 19 are tightened the clamps 18 exert pressure on the cutter which they overlap and thus cause said cutter to be clamped securely in the rabbet in the holder which supports the cutter.

In order that nail holes may easily be formed in the shingles cut in the machine, a hand punch 20 is mounted in lugs 21 that project laterally from one side of the movable cutter holder 2 and the stationary cutter holder 1 is provided with a table or support 22 on which a shingle can be positioned during the operation of punching a nail hole in the shingle. The table or shingle support 22 is provided with a hole 22$^a$ that acts as a die for the punch and the punch is normally held in an elevated position by means of a coiled expansion spring 23 that is mounted on the shank of the punch between one of the laterally-projecting lugs 21 on the cutter holder 2 and a collar 24 that is fastened to the shank of the punch. At the upper end of the shank of the punch is a hand piece 25 which the user strikes with the palm of his hand during the operation of forcing the punch through a shingle that is positioned on the table or support 22 on the stationary cutter holder 1.

A machine of the construction above described has all of the desirable features and characteristics of the machine that forms the subject-matter of my prior patent previously referred to, and it has the added advantage of being able to be adjusted easily to adapt it to shingles or sheets of different thicknesses and it also comprises a punch that can be operated easily by the user's palm independently of the operating mechanism for the movable cutter of the machine.

Having thus described my invention, what I claim as new and desire to secure by Letters Patent is:

1. A cutting machine, comprising a stationary cutter holder and a movable cutter holder equipped with opposed cutters, stationary guides that embrace the end portions of the movable cutter holder, levers pivotally mounted on said guides above said movable cutter holder and equipped with cams for imparting a stroke to same, springs that exert pressure on said movable cutter holder in a direction to hold the cutters separated, and removable shims arranged between said cams and the opposed end portions of said movable cutter holder and adapted to be bodily removed and replaced by shims of different thickness when it is desired to vary the stroke of the movable cutter.

2. A cutting machine, comprising a stationary cutter holder and a reciprocating cutter holder arranged in opposed relation, rabbets in the adjacent edges of said holders, removable cutters in said rabbets, and adjustable clamping devices connected to said holders at points outside of said rabbets and arranged so that they lap over said cutters and press them tightly against the side walls of said rabbets.

3. A cutting machine, comprising a stationary cutter holder and a movable cutter holder each equipped with a cutter, an operating mechanism for actuating said movable cutter holder, a work support on said stationary cutter holder, and a hand punch capable of being operated independently of said operating mechanism, carried by said movable cutter holder and arranged above said work support.

4. A cutting machine, comprising a stationary cutter holder and a movable cutter holder arranged in opposed relation and each equipped with a cutter, an operating mechanism for reciprocating said movable cutter holder, a work support projecting laterally from one side of said stationary cutter holder, lugs projecting laterally from said movable cutter holder, a reciprocating punch carried by said lugs, and a spring that normally holds said punch in an elevated position above said work support.

BENO J. GUNDLACH.